US009641248B1

(12) United States Patent
Koehler et al.

(10) Patent No.: US 9,641,248 B1
(45) Date of Patent: May 2, 2017

(54) SIGNAL EXTENDER FOR SATELLITE COMMUNICATIONS SYSTEM

(71) Applicant: Rockwell Collins, Inc., Cedar Rapids, IA (US)

(72) Inventors: Bradley J. Koehler, Minnetonka, MN (US); Sarah A. Miller, Cedar Rapids, IA (US); Matthew J. Poduska, Mount Vernon, IA (US); Ryan J. Coppa, Cedar Rapids, IA (US); Tyler T. Karrels, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 186 days.

(21) Appl. No.: 14/087,755

(22) Filed: Nov. 22, 2013

(51) Int. Cl.
*H04B 7/00* (2006.01)
*H04B 10/118* (2013.01)

(52) U.S. Cl.
CPC ................... *H04B 10/118* (2013.01)

(58) Field of Classification Search
None
See application file for complete search history.

(56) References Cited

U.S. PATENT DOCUMENTS

| | | | | |
|---|---|---|---|---|
| 6,052,558 A * | 4/2000 | Cook | ............... | H04B 7/18536 455/12.1 |
| 7,990,332 B1 * | 8/2011 | Tischer | ............... | H01Q 1/125 343/810 |
| 2010/0195775 A1 * | 8/2010 | Chamberlain | ....... | H04B 1/1036 375/350 |
| 2012/0170507 A1 * | 7/2012 | Sawai | ............... | H04B 7/0413 370/315 |
| 2012/0307710 A1 * | 12/2012 | Yoon | ............... | H04B 7/15542 370/315 |
| 2014/0050144 A1 * | 2/2014 | Ma | ............... | H04B 7/15542 370/315 |
| 2014/0160930 A1 * | 6/2014 | Kwon | ............... | H04W 16/26 370/235 |

* cited by examiner

*Primary Examiner* — Mohammed Rachedine
(74) *Attorney, Agent, or Firm* — Angel N. Gerdzhikov; Donna P. Suchy; Daniel M. Barbieri

(57) ABSTRACT

A signal extender and method for extending signals of a satellite is disclosed. The apparatus includes a terminal device interface, an antenna interface and a controller in communication with the terminal device interface and the antenna interface. The terminal device interface is configured for communicating with at least one terminal device. The antenna interface is configured for communicating with an antenna to facilitate communication with the satellite. Upon receiving a downlink signal from the satellite via the antenna interface, the controller processes the downlink signal to identify an intended terminal device among the at least one terminal device and transmits the downlink signal to the intended terminal device via the terminal device interface, and upon receiving an uplink signal from a particular terminal device via the terminal device interface, the controller transmits the uplink signal to the satellite via the antenna interface.

20 Claims, 4 Drawing Sheets

SIGNAL EXTENDER FOR SATELLITE COMMUNICATIONS SYSTEM

TECHNICAL FIELD

The present disclosure relates generally to signal processing, and more particularly to extending signals of a satellite communications system.

BACKGROUND

A communications satellite is an artificial satellite sent to space for the purpose of telecommunications. A communications system utilizing one or more communications satellites may be referred to as a satellite communications system.

SUMMARY

The present disclosure is directed to an apparatus for extending signals of a satellite. The apparatus includes a terminal device interface, an antenna interface and a controller in communication with the terminal device interface and the antenna interface. The terminal device interface is configured for communicating with at least one terminal device. The antenna interface is configured for communicating with an antenna to facilitate communication with the satellite. Upon receiving a downlink signal from the satellite via the antenna interface, the controller processes the downlink signal to identify an intended terminal device among the at least one terminal device and transmits the downlink signal to the intended terminal device via the terminal device interface, and upon receiving an uplink signal from a particular terminal device via the terminal device interface, the controller transmits the uplink signal to the satellite via the antenna interface.

Another embodiment of the present disclosure is directed to a method for extending signals of a satellite. The method includes: establishing a communication between a signal extender and at least one terminal device; receiving at the signal extender a downlink signal, the downlink signal being a signal received from the satellite via an antenna in communication with the signal extender; processing the downlink signal to identify an intended terminal device, the intended terminal device being one of the at least one terminal device in communication with the signal extender; and transmitting the downlink signal from the signal extender to the intended terminal device.

A further embodiment of the present disclosure is also directed to a method for extending signals of a satellite. The method includes establishing a communication between a signal extender and at least one terminal device; receiving at the signal extender a downlink signal, the downlink signal being a signal received from the satellite via an antenna in communication with the signal extender; processing the downlink signal to identify an intended terminal device, the intended terminal device being one of the at least one terminal device in communication with the signal extender; transmitting the downlink signal from the signal extender to the intended terminal device; receiving at the signal extender an uplink signal, the uplink signal being received from a particular terminal device of the at least one terminal device in communication with the signal extender; and transmitting the uplink signal from the signal extender to the satellite via the antenna.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

A satellite communications system utilizes one or more satellites to provide satellite communications. Since some of the satellite signals are line-of-sight, the signals may not reach into all desired service areas. In addition, some small end devices/terminals may not have the abilities to communicate with the satellite. For example, small, low-cost omnidirectional antennas may be inadequate to carry out communications with a satellite. Other small devices such as handheld radios may lack sufficient power to transmit signals directly to a satellite. Therein lies a need for an apparatus to deliver satellite signals to designated/desired service areas.

The present disclosure is directed to an apparatus referred to as the signal extender. The signal extender is configured to receive and process downlink signals from a communication satellite and re-transmit the signals, at lower power levels, to terminals over a subscriber protocol. The signal extender may also be configured to process uplink signals from the terminals and transmit the uplink signals to the satellite, therefore providing a two way communication.

Figure 1:
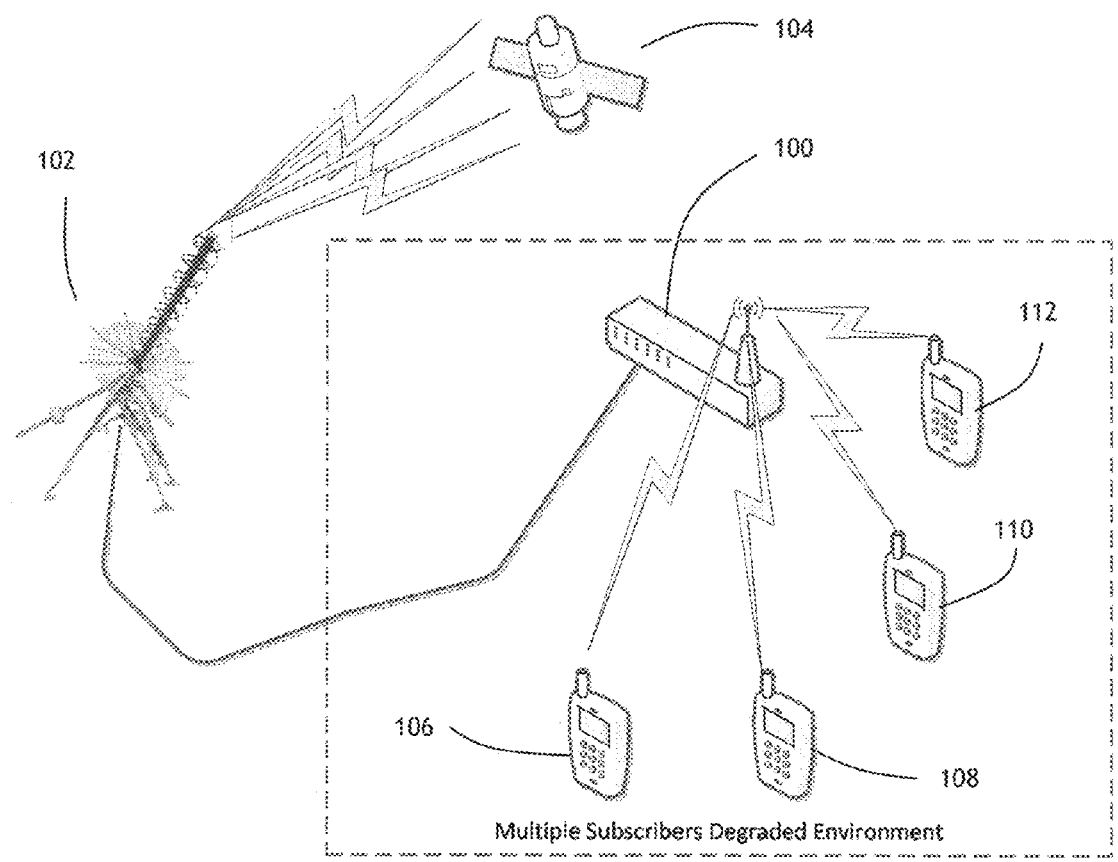
FIG. 1 is an illustration depicting a satellite signal extender operating in an extender mode.

Referring to FIG. 1, an illustration depicting a signal extender 100 in accordance with one embodiment of the present disclosure is shown. The signal extender 100 is communicatively connected to a unidirectional high gain antenna 102. The antenna 102 may be placed in a remote, optimal position, away from obstructions to establish a line-of-sight communication with at least one satellite.

The antenna 102 is utilized to facilitate communications between the satellite 104 and the signal extender 100. More specifically, the extender 100 is configured to communicate with the satellite 104 utilizing a specific satellite communication standard through an appropriate antenna for the specific communication spectrum. For example, if the satellite is one of the Mobile User Objective System (MUOS) satellites, the antenna 102 utilized should be appropriate for the Ultra High Frequency (UHF, 300 MHz to 3 GHz frequency range) communication spectrum. It is noted that MUOS is referenced in the present disclosure as an exemplary satellite communications system. It is contemplated that the signal extender 100 may be configured to be compatible with various other types of satellite communications systems without departing from the spirit and scope of the present disclosure.

Since the signal extender 100 is communicatively connected to the antenna 102, the downlink signals received from the satellite 104 can be provided to the signal extender 100 to be processed and re-transmitted to one or more terminals (may also be referred to as end devices) 106 through 112. It is contemplated that the signals re-transmitted from the signal extender 100 to the terminals 106 through 112 may be transmitted at different power levels than that utilized by the satellites. It is also contemplated that the signal extender 100 may be configured to support various wired or wireless communication protocols to communicate with the terminals 106 through 112. For instance, the signal extender 100 may support a wireless communication protocol (e.g., 3GPP, WiFi, WiMax or the like) to communicate with terminal 106, in which case the signal extender 100 is configured to provide a MUOS-to-wireless standard (e.g., 3GPP, WiFi, WiMax or the like) translation/conversion. Additionally/alternatively, the signal extender 100 may also support a wired communication protocol (e.g., Ethernet or the like) to communicate with another terminal 108, in which case the signal extender 100 is configured to provide a MUOS-to-wired standard (e.g., Ethernet or the like) translation/conversion. The ability to provide protocol conversions between MUOS and various wired or wireless communication protocols allows the signal extender 100 to be compatible with different types of terminals and communication standards.

In addition to re-transmitting downlink signals received from the satellite 104 to the terminals, the signal extender 100 is also configured to process uplink signals from the terminals and transmit the signals to the satellite 104 via the antenna 102. It is contemplated that the protocol conversion capabilities between MUOS and various wired or wireless communication protocols can be provided in both communication directions, allowing the terminals to communicate with the signal extender 100 using any compatible communication protocol of their choosing and minimizing the amount of processing and/or modifications required at the terminals.

It is also contemplated that the signal extender 100 may present each terminal as an individual subscriber to the satellite. Using the example depicted in FIG. 1, in this operation mode, the signal extender 100 is configured to establish a separate communication channel for each terminal 106, 108, 110 and 112, providing a point-to-point communication between each terminal and the satellite communication system through the signal extender 100. That is, each terminal is provisioned and appears as a unique subscriber in this operation mode.

Figure 2:
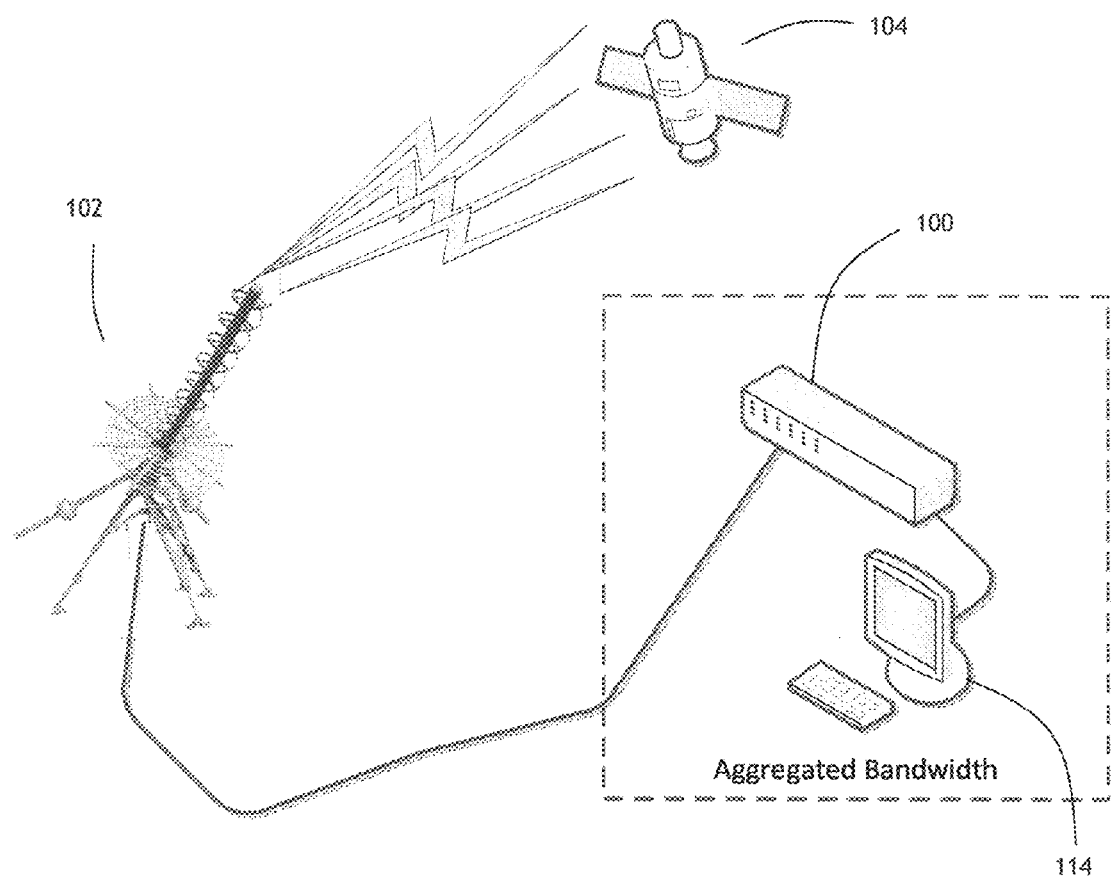
FIG. 2 is an illustration depicting the satellite signal extender operating in a high capacity mode.

The signal extender 100 may also be configured to provide an alternative operation mode (may be referred to as high capacity mode). When operating in high capacity mode, the signal extender 100 may aggregate multiple subscriber allocations to provide an aggregated bandwidth for a particular terminal. For instance, as depicted in FIG. 2, the signal extender 100 may aggregate four communication channels and provide the aggregated capacity to a single terminal 114, allowing the terminal 114 to operate at a higher capacity compared to each individual channel. While the terminal 114 is connected to the signal extender 100 via a wired connection, it is understood that such a connection is merely exemplary. It is also understood that the number of terminals and/or communication channels supported by the signal extender 100 is not limited to four as shown in the figures. The specific number of terminals and/or channels supported by a particular signal extender may vary without departing from the spirit and scope of the present disclosure.

It is contemplated that the signal extender 100 may require each terminal to initialize its communication with the signal extender 100 when the terminal is connected to the signal extender 100 for the first time. For a terminal that communicates with the signal extender 100 using a wired connection, the initialization process may be invoked when the signal extender 100 receives data communication from that terminal at a physical port. Upon receiving the data communication, if the signal extender 100 determines that the terminal does not have a previously established connection, a new connection may be established. The signal extender 100 may also present itself being available via various wireless communication protocols that it supports (e.g., 3GPP, WiFi, WiMax or the like). In this manner, a terminal that implements a WiFi protocol, for example, may recognize the availability of the signal extender 100 and attempt to initiate communication with the signal extender 100. It is contemplated that additional processes and techniques such as authentication, tacking, encryption or the like may also be utilized without departing from the spirit and scope of the present disclosure.

It is also contemplated that while the signal extender 100 is configured to communicate with various terminals via various wired or wireless communication protocols, the communications between the signal extender 100, the antenna 102 and the satellite 104 are required to follow the specific satellite communication standard of the satellite communications system. For instance, if the satellite is one of the MUOS satellites, all communications between the signal extender 100, the antenna 102 and the satellite 104 are required to follow the MUOS standard. This requirement ensures the communication safety of the MUOS is enforced and rejects any unauthorized attempts to communicate with the MUOS satellite.

Figure 3:
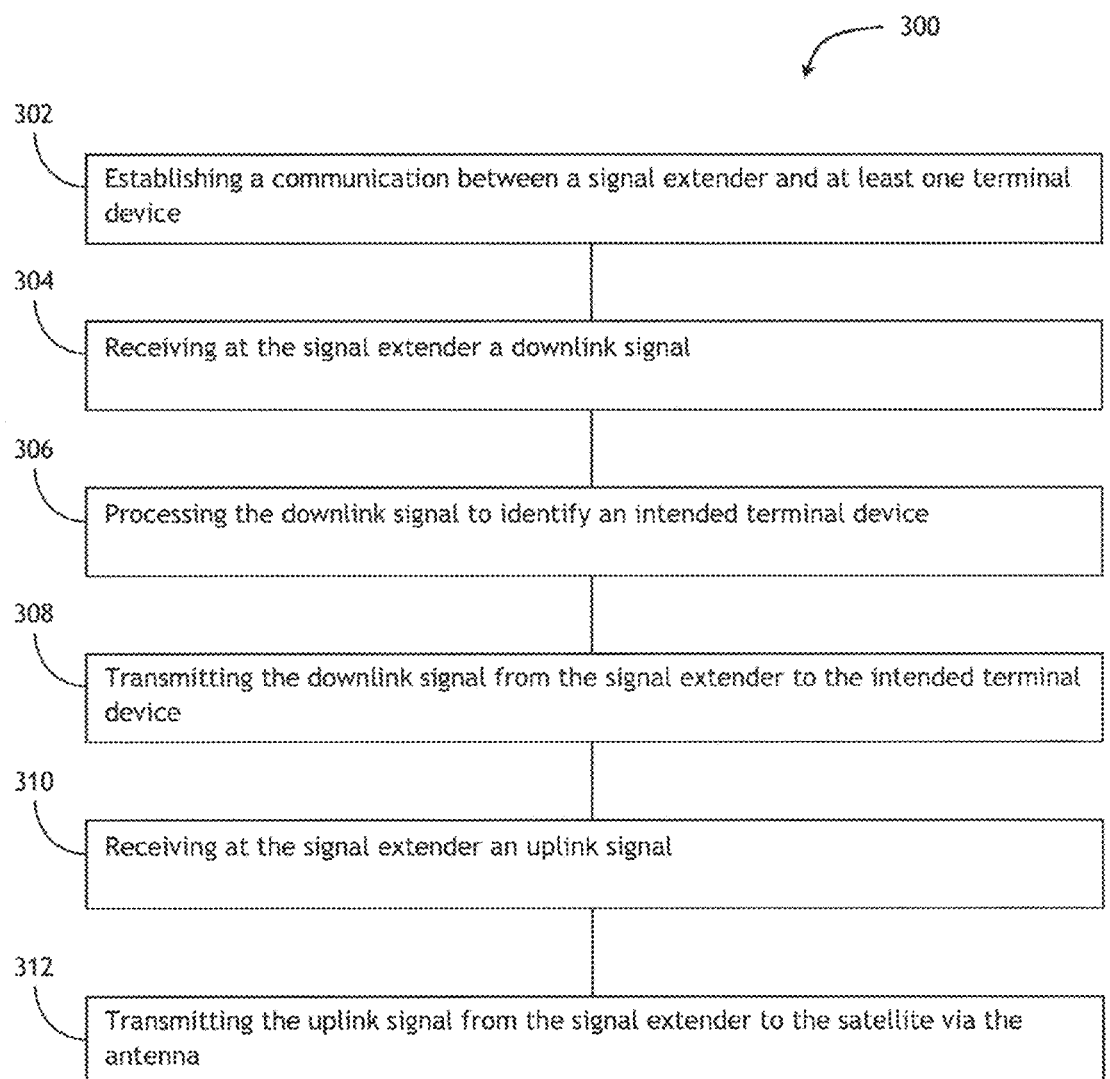
FIG. 3 is a flow diagram depicting a method for extending signals of a communications satellite.

Referring now to FIG. 3, a flow diagram depicting a method 300 for providing satellite signal extension is shown. In accordance with the present disclosure, a signal extender is utilized to provide signal extension. Once a connection is established between a terminal device and the signal extender in step 302, the signal extender can be utilized to facilitate transmission of downlink signals from a satellite to the terminal and to facilitate transmission of uplink signals from the terminal to the satellite.

More specifically, in step 304, the signal extender may receive a downlink signal transmitted from the satellite to an antenna that is in communication with the signal extender. The signal extender may then process the signal received in step 306 and determine which terminal is the intended receiving terminal. If the receiving terminal is configured to communicate with the signal extender using a communication protocol different than the specific satellite communication standard used by the satellite, the signal extender may convert/translate the signal to the communication protocol utilized by the receiving terminal. The signal extender may subsequently transmit the processed signal to the receiving terminal in step 308. It is noted that signal transmissions in step 308 may be carried out at power levels that are different from the power level utilized by the satellite.

As further depicted in FIG. 3, the signal extender may also receive an uplink signal transmitted from a terminal in step 310 and facilitate transmission of this uplink signal to the satellite. The signal extender may process the signal received in step 312 and if the terminal that is sending the uplink signal to the signal extender is using a communication protocol different than the specific satellite communication standard, the signal extender may convert/translate the signal to the specific satellite communication standard. The signal extender may subsequently transmit the converted signal to the antenna in step 314, which then transmits the signal to the satellite it is in communication with.

As described previously, the signal extender may be configured to establish a separate communication channel for each terminal connected to the signal extender (wired or wireless). Additionally/alternatively, the signal extender may aggregate the bandwidth of two or more channels and allocate the aggregated bandwidth to a particular terminal to provide this particular terminal a high capacity mode of operation. It is contemplated that whether to implement the high capacity mode, and how many terminals are allowed to operate in the high capacity mode may be determined based on the specific applications, availability of the channels, environmental constraints as well as other factors without departing from the spirit and scope of the present disclosure.

Figure 4:
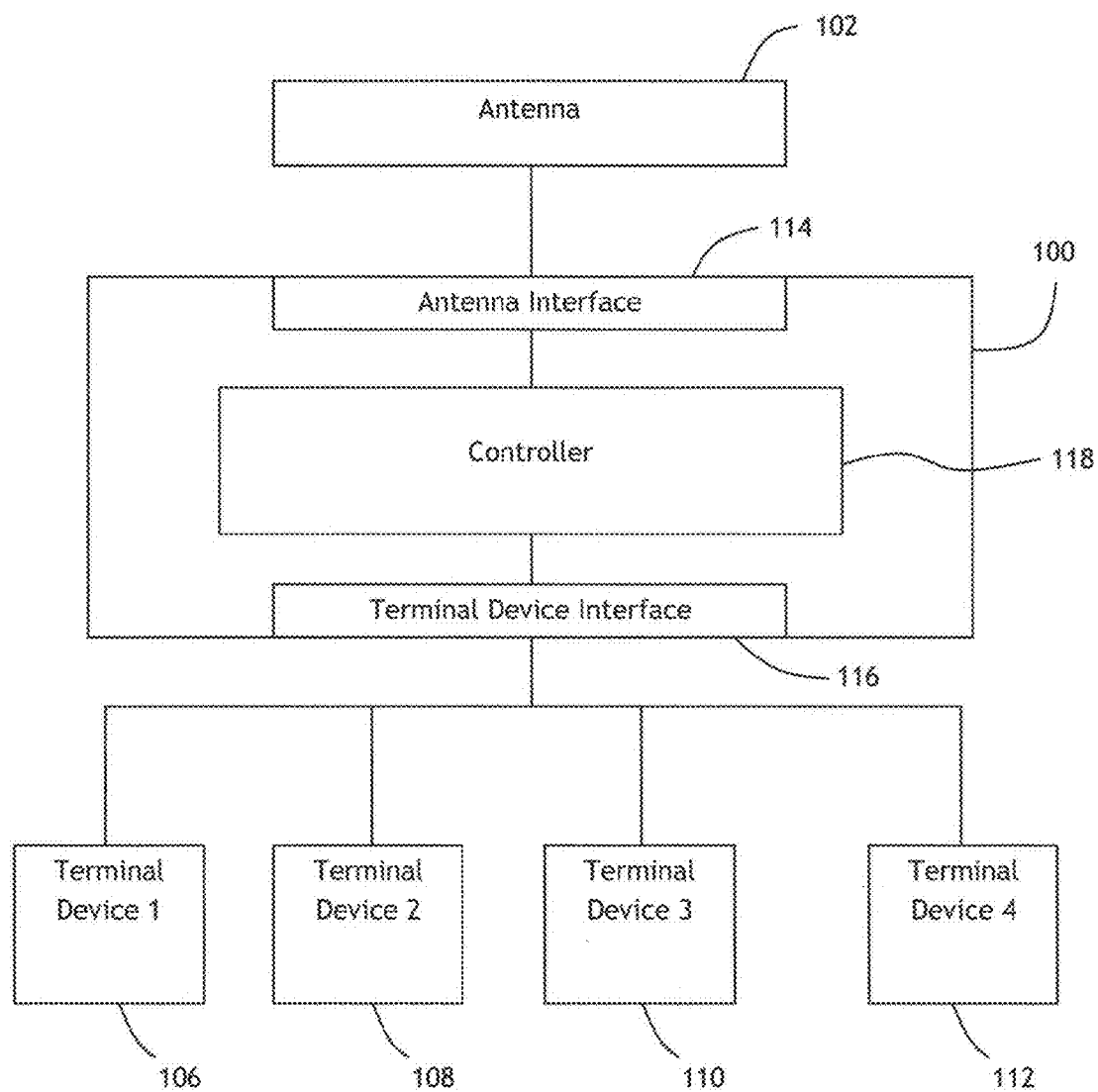
FIG. 4 is a block diagram illustrating the satellite signal extender.

Referring to FIG. 4, a block diagram illustrating the signal extender 100 is shown. The signal extender 100 includes an antenna interface 114 to communicate with the antenna 102 and a terminal device interface 116 to communicate with one or more terminal devices 106 through 112. The signal extender 100 also includes a controller/processor 118 configured to process and transmit signals between the antenna interface 114 and the terminal device interface 116. More specifically, upon receiving a downlink signal from a satellite via the antenna interface 114, the controller 118 processes the downlink signal to identify an intended terminal device and transmits the downlink signal to the intended terminal device via the terminal device interface 116. On the other hand, upon receiving an uplink signal from a terminal device via the terminal device interface 116, the controller 118 transmits the uplink signal to the satellite via the antenna interface 114. It is contemplated that the controller 118 may also perform necessary protocol conversions as described above to facilitate communications between the satellite and the terminal devices.

It is understood that while the Mobile User Objective System (MUOS) is referenced in the descriptions above, such a system is merely exemplary. The apparatus and methods for extending signals as described above are applicable to various other types of satellite communications systems without departing from the spirit and scope of the present disclosure. In addition, it is understood that MUOS standard is not required to be the communication standard for a given satellite communications system, and that the ability to provide protocol conversions between the communication standard of a given satellite communications system and various wired or wireless communication protocols may also be utilized without departing from the spirit and scope of the present disclosure.

It is to be understood that the present disclosure may be conveniently implemented in forms of a software/firmware package. Such a software/firmware package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. An apparatus for extending signals of a satellite, the apparatus comprising:
   a terminal device interface for communicating with at least one terminal device;
   an antenna interface for communicating with an antenna, the antenna being configured to communicate with the satellite; and
   a controller in communication with the terminal device interface and the antenna interface, wherein upon receiving a downlink signal from the satellite via the antenna interface at a first power level, the controller processes the downlink signal to identify an intended terminal device among the at least one terminal device and transmits the downlink signal to the intended terminal device via the terminal device interface at a second power level lower than the first power level, and wherein upon receiving an uplink signal from a particular terminal device via the terminal device interface at the second power level, the controller transmits the uplink signal to the satellite via the antenna interface at the first power level,
   wherein the controller is configured to provide a first mode of operation or a second mode of operation based on capacity requirement of the at least one terminal device, wherein each of the at least one terminal device is allocated with a unique channel to communicate with the terminal device interface when operating in the first mode of operation, and wherein at least one of the at least one terminal device is allocated with an aggregated bandwidth having a bandwidth of a plurality of channels to communicate with the terminal device interface when operating in the second mode of operation.

2. The apparatus of claim 1, wherein the antenna interface is configured to communicate with the satellite via the antenna utilizing a specific satellite communication standard, and wherein upon receiving the downlink signal from the satellite, the controller is further configured to:
   determine a communication protocol established between the terminal device interface and the intended terminal device; and convert the downlink signal from the specific satellite communication standard to the determined communication protocol prior to transmitting the downlink signal to the intended terminal device.

3. The apparatus of claim 1, wherein the antenna interface is configured to communicate with the satellite via the antenna utilizing a specific satellite communication standard, and wherein upon receiving the uplink signal from the particular terminal device, the controller is further configured to:
determine a communication protocol established between the terminal device interface and the particular terminal device; and
convert the uplink signal from the determined communication protocol to the specific satellite communication standard prior to transmitting the uplink signal to the satellite.

4. The apparatus of claim 1, wherein the satellite is a Mobile User Objective System (MUOS) satellite, and the antenna interface is configured to communicate with the satellite via the antenna utilizing the MUOS standard.

5. The apparatus of claim 4, wherein each of the at least one terminal device in communication with the terminal device interface is provisioned a unique MUOS channel and appears as a unique MUOS subscriber to the MUOS.

6. The apparatus of claim 4, wherein at least one terminal device in communication with the terminal device interface is provided an aggregated bandwidth including allocated bandwidth of at least two MUOS channels.

7. The apparatus of claim 1, wherein the antenna is a unidirectional high gain antenna.

8. A method for extending signals of a satellite, the method comprising:
establishing a communication between a signal extender and at least one terminal device;
receiving at the signal extender a downlink signal, the downlink signal being at a first power level and being a signal received from the satellite via an antenna in communication with the signal extender;
processing the downlink signal to identify an intended terminal device, the intended terminal device being one of the at least one terminal device in communication with the signal extender; and
transmitting the downlink signal from the signal extender to the intended terminal device at a second power level lower than the first power level, wherein the downlink signal is transmitted in a first mode of operation or a second mode of operation based on capacity requirement of the at least one terminal device, wherein the downlink signal is transmitted in the first mode of operation by providing each of the at least one terminal device with a unique channel to communicate with the signal extender, and wherein the downlink signal is transmitted in the second mode of operation by providing at least one of the at least one terminal device with an aggregated bandwidth having allocated bandwidth of a plurality of channels to communicate with the signal extender.

9. The method of claim 8, wherein the downlink signal received from the satellite is in accordance with a specific satellite communications standard, and wherein processing the downlink signal further comprises:
determining a communication protocol established between the signal extender and the intended terminal device; and
converting the downlink signal from the specific satellite communication standard to the determined communication protocol prior to transmitting the downlink signal from the signal extender to the intended terminal device.

10. The method of claim 8, further comprising:
receiving at the signal extender an uplink signal, the uplink signal being received from a particular terminal device of the at least one terminal device in communication with the signal extender; and
transmitting the uplink signal from the signal extender to the satellite via the antenna.

11. The method of claim 10, further comprising:
determining a communication protocol established between the signal extender and the particular terminal device; and
converting the uplink signal from the determined communication protocol to a specific satellite communications standard prior to transmitting the uplink signal from the signal extender to the satellite via the antenna.

12. The method of claim 8, wherein the satellite is a Mobile User Objective System (MUOS) satellite, and the antenna is configured to communicate with the satellite utilizing the MUOS standard.

13. The method of claim 12, wherein each of the at least one terminal device in communication with the MUOS signal extender is provisioned a unique MUOS channel and appears as a unique MUOS subscriber to the MUOS.

14. The method of claim 12, wherein at least one terminal device in communication with the MUOS signal extender is provided an aggregated bandwidth including allocated bandwidth of at least two MUOS channels.

15. A method for extending signals of a satellite, the method comprising:
establishing a communication between a signal extender and at least one terminal device;
receiving at the signal extender a downlink signal, the downlink signal being at a first power level and being a signal received from the satellite via an antenna in communication with the signal extender;
processing the downlink signal to identify an intended terminal device, the intended terminal device being one of the at least one terminal device in communication with the signal extender;
transmitting the downlink signal from the signal extender to the intended terminal device at a second power level lower than the first power level;
receiving at the signal extender an uplink signal, the uplink signal being at the second power level and being received from a particular terminal device of the at least one terminal device in communication with the signal extender; and
transmitting the uplink signal from the signal extender to the satellite via the antenna at the first power level,
wherein the downlink signal and the uplink signal are transmitted in a first mode of operation or a second mode of operation based on capacity requirement of the at least one terminal device, wherein the downlink signal and the uplink signal are transmitted in the first mode of operation by providing each of the at least one terminal device with a unique channel to communicate with the signal extender, and wherein the downlink signal and the uplink signal are transmitted in the second mode of operation by providing at least one of the at least one terminal device with an aggregated bandwidth having allocated bandwidth of a plurality of channels to communicate with the signal extender.

16. The method of claim 15, wherein the downlink signal received from the satellite is in accordance with a specific satellite communications standard, and wherein processing the downlink signal further comprises:
- determining a communication protocol established between the signal extender and the intended terminal device; and
- converting the downlink signal from the specific satellite communication standard to the determined communication protocol prior to transmitting the downlink signal from the signal extender to the intended terminal device.

17. The method of claim 15, further comprising:
- determining a communication protocol established between the signal extender and the particular terminal device; and
- converting the uplink signal from the determined communication protocol to a specific satellite communications standard prior to transmitting the uplink signal from the signal extender to the satellite via the antenna.

18. The method of claim 15, wherein the satellite is a Mobile User Objective System (MUOS) satellite, and the antenna is configured to communicate with the satellite utilizing the MUOS standard.

19. The method of claim 18, wherein each of the at least one terminal device in communication with the MUOS signal extender is provisioned a unique MUOS channel and appears as a unique MUOS subscriber to the MUOS.

20. The method of claim 18, wherein at least one terminal device in communication with the MUOS signal extender is provided an aggregated bandwidth including allocated bandwidth of at least two MUOS channels.

* * * * *